United States Patent
Momiuchi et al.

(10) Patent No.: US 6,813,306 B2
(45) Date of Patent: Nov. 2, 2004

(54) SOLID-STATE LASER DEVICE

(75) Inventors: Masayuki Momiuchi, Tokyo-to (JP); Taizo Eno, Tokyo-to (JP); Yoshiaki Goto, Tokyo-to (JP)

(73) Assignee: Kabushiki Kaisha TOPCON, Toyko-to (JP)

(*) Notice: Subject to any disclaimer, the term of this patent is extended or adjusted under 35 U.S.C. 154(b) by 0 days.

(21) Appl. No.: 10/361,435

(22) Filed: Feb. 10, 2003

(65) Prior Publication Data

US 2004/0095981 A1 May 20, 2004

(30) Foreign Application Priority Data

Nov. 19, 2002 (JP) ........................... 2002-335683

(51) Int. Cl.⁷ .............. H01S 3/10; H01S 3/14; H01S 3/082; G02F 1/35
(52) U.S. Cl. .............. 372/97; 372/21; 372/22; 372/68; 359/326
(58) Field of Search .............. 372/68, 21, 97, 372/22, 20, 71; 359/326, 327, 328; 377/97

(56) References Cited

U.S. PATENT DOCUMENTS

| 4,338,578 A | * 7/1982 | Sukhman | 372/23 |
| 5,084,879 A | 1/1992 | Suzuki et al. | 372/22 |
| 5,287,381 A | 2/1994 | Hyuga et al. | 372/75 |
| 5,345,457 A | * 9/1994 | Zenzie et al. | 372/22 |
| 5,675,593 A | 10/1997 | Oka | 372/21 |
| 5,854,802 A | * 12/1998 | Jin et al. | 372/22 |
| 6,327,291 B1 | * 12/2001 | Marshall | 372/75 |
| 6,636,537 B2 | * 10/2003 | Takada | 372/23 |

* cited by examiner

Primary Examiner—Don Wong
Assistant Examiner—Armando Rodriguez
(74) Attorney, Agent, or Firm—Nields & Lemack

(57) ABSTRACT

A solid-state laser device, comprising a first resonator arranged on a first optical axis, a second resonator arranged on a second optical axis, a first light emitter for entering an excitation light to the first resonator, a second light emitter for entering an excitation light to the second resonator, a common optical axis portion commonly used by the first optical axis and the second optical axis, a wavelength separating plate for separating the first optical axis from the second optical axis so that the common optical axis portion can be commonly used by the optical axes, an output portion provided on the common optical axis portion, a first solid-state laser medium arranged on a separated optical axis of the first optical axis, a second solid-state laser medium arranged on a separated optical axis of the second optical axis, and an optical crystal for wavelength conversion arranged on the common optical axis portion.

5 Claims, 6 Drawing Sheets

SOLID-STATE LASER DEVICE

BACKGROUND OF THE INVENTION

The present invention relates to a semiconductor laser device, in particular, to a solid-state laser device, and further relates to a solid-state laser device which is oscillated in two wavelengths by a resonator and converts the wavelength in the resonator.

A diode pumped solid-state laser is known, which uses intracavity type SHG mode to convert frequency of a laser beam from a fundamental frequency.

Referring to FIG. 5, description will be given on general features of the diode pumped solid-state laser of one-wavelength oscillation.

In FIG. 5, reference numeral 2 denotes a light emitter, and 3 is an optical resonator. The light emitter 2 comprises an LD light emitter 4 and a condenser lens 5. Further, the optical resonator 3 comprises a laser crystal 8 where a dielectric reflection film 7 is formed, a nonlinear optical medium (NLO) 9, and a concave mirror 12 where a dielectric reflection film 11 is formed. A laser beam is pumped at the optical resonator 3, and the laser beam is outputted by resonation and amplification. As the laser crystal 8, $Nd:YVO_4$ may be used. As the nonlinear optical medium 9, KTP ($KTiOPO_4$; titanyl potassium phosphate) may be used.

Further description will be given below.

A laser light source 1 is used to emit a laser beam with a wavelength of 809 nm, for instance, and the LD light emitter 4, i.e. a semiconductor laser, is used. The LD light emitter 4 has the function as a pumping light generator for generating an excitation light. The laser light source 1 is not limited to the semiconductor laser, and any type of light source means can be adopted so far as it can emit a laser beam.

The laser crystal 8 is used for amplification of light. As the laser crystal 8, $Nd:YVO_4$ with an oscillation line of 1064 nm is used. In addition, YAG (yttrium aluminum garnet) doped with $Nd^{3+}$ ion or the like is adopted. YAG has oscillation lines of 946 nm, 1064 nm, 1319 nm, etc. Also, Ti (sapphire) with oscillation lines of 700–900 nm can be used.

On the LD light emitter 4 side of surfaces of the laser crystal 8, a first dielectric reflection film 7 is formed. The first dielectric reflection film 7 is highly transmissive to a laser beam from the LD light emitter 4 and is highly reflective to an oscillation wavelength of the laser crystal 8, and it is also highly reflective to SHG (second harmonic generation).

The concave mirror 12 is designed to face to the laser crystal 8. The laser crystal 8 side of surfaces of the concave mirror 12 is fabricated in form of a concaved spherical mirror having an adequate radius and a second dielectric reflection film 11 is formed on it. The second dielectric reflection film 11 is highly reflective to the oscillation wavelength of the laser crystal 8, and it is highly transmissive to SHG (second harmonic generation).

As described above, when the first dielectric reflection film 7 of the laser crystal 8 is composed with the second dielectric reflection film 11 of the concave mirror 12 and the laser beam from the LD light emitter 4 is pumped to the laser crystal 8 via the condenser lens 5, the light is reciprocally projected between the first dielectric reflection film 7 of the laser crystal 8 of and the second dielectric reflection film 11. Thus, the light can be confined for longer time, and the light can be resonated and amplified.

The nonlinear optical medium 9 is inserted in the optical resonator, which comprises the first dielectric reflection film 7 of the laser crystal 8 and the concave mirror 12. When an intensive coherent light such as a laser beam enters the nonlinear optical medium 9, a second harmonic wave to double the light frequency is generated. The generation of the second harmonic wave is called "second harmonic generation (SHG)". As a result, a laser beam with a wavelength of 532 nm is emitted from the laser light source 1.

In the laser light source 1 as described above, the nonlinear optical medium 9 is inserted into the optical resonator, which comprises the first dielectric reflection film 7 of the laser crystal 8 and the concave mirror 12, and it is called an intracavity type SHG. Because conversion output is proportional to square of excited photoelectric power, there is such effect that high light intensity in the optical resonator can be directly utilized.

Further, a type of solid-state laser device is known, by which an entered laser beam of a fundamental frequency is oscillated to two different wavelengths and these are further converted to different frequencies by using sum frequency mixing (SFM) and differential frequency mixing (DFM).

Description will be given on the solid-state laser device as described above referring to FIG. 6. In FIG. 6, the LD light emitter 4 and the condenser lens 5 are omitted.

As seen from the LD light emitter 4, there are arranged a concave mirror 12, a laser crystal 8, a first plane reflection mirror 14, a nonlinear optical medium 9, a second plane reflection mirror 15, and a third plane reflection mirror 16.

The concave mirror 12 is highly transmissive to a wavelength $\lambda i$ (809 nm in the figure), and it is highly reflective to a wavelength $\lambda 1$ (1342 nm in the figure) and a wavelength $\lambda 2$ (1064 nm in the figure). Further, the first plane reflection mirror 14 is highly reflective to SFM (wavelength $\lambda 3=593$ nm in the figure) and is highly transmissive to the wavelengths $\lambda 1$ and $\lambda 2$. The second plane reflection mirror 15 is highly transmissive to the wavelengths $\lambda 3$ and $\lambda 2$, and it is highly reflective to the wavelength $\lambda 1$. The third plane reflection mirror 16 is highly transmissive to the wavelength $\lambda 3$ and is highly reflective to the wavelength $\lambda 2$.

The excitation light $\lambda i$ entered via the concave mirror 12 excites the laser crystal ($Nd:YVO_4$). Among the natural released light beams, the light beams with the wavelengths $\lambda 1$ and $\lambda 2$ are pumped and resonated between the concave mirror 12 and the second plane reflection mirror 15 and between the concave mirror 12 and the third plane reflection mirror 16. The wavelength of $\lambda 1$ is excited and amplified, and the wavelength of $\lambda 2$ is excited and amplified. Further, the laser beams with both wavelengths pass through the nonlinear optical medium 9. As a result, sum frequency $\lambda 3$ of both wavelengths can be obtained, and the laser beams pass through the third plane reflection mirror 16 and are projected.

In case of sum frequency mixing (SFM), there exists a relationship: $1/\lambda 3=1/\lambda 1+1/\lambda 2$. By selecting the nonlinear optical medium 9, differential frequency mixing can be obtained. In this case, there exists a relationship: $1/\lambda 3=1/\lambda 1-1/\lambda 2$ (where $\lambda 1<\lambda 2$).

In the frequency conversion of the above described solid-state laser device for generating sum frequency mixing (SFM) and differential frequency mixing (DFM), it is advantageous in that wavelength conversion can be achieved with high efficiency by arranging the nonlinear optical medium 9 in the optical resonator.

A conventional type example as described above is written, for instance, in F. chen. and S. W. Tssi: Opt. Lett. 27 (2002), 397.

In the solid-state laser device shown in FIG. 6, sum frequency mixing (SFM) and differential frequency mixing (DFM) are generated, and frequency conversion is performed. It is advantageous in that wavelength conversion can be carried out with high efficiency, while it has the following disadvantages:

The laser beam, which can be inputted to the laser crystal 8, is under excitation input limitation at a breakdown threshold value of the crystal, and it is difficult to have high output.

In order to raise excitation efficiency, the fundamental wave with the wavelength λ1 is needed to be on the same optical axis as the fundamental wave with the wavelength λ2. Because the concave mirror 12, the second plane reflection mirror 15 and the third plane reflection mirror 16 are arranged on a common optical axis, it is difficult to perfectly match the two optical axes with the wavelengths of λ1 and λ2 by adjusting the concave mirror 12, the second plane reflection mirror 15 and the third plane reflection mirror 16.

Further, the nonlinear optical medium 9 must be arranged on a portion of the laser beam with higher energy density (beam waist) in order to have higher efficiency. The beam waist (W) is obtained from the equation (1) given below, and the position is different if the wavelength λ is different. Therefore, as shown in FIG. 6, if the laser crystal 8 is provided commonly for the wavelengths λ1 and λ2, the nonlinear optical medium 9 cannot be placed at the positions of the beam waist of the wavelength λ1 and of the beam waist of the wavelength λ2, and conversion efficiency is decreased.

$$\omega = \sqrt{\{\lambda \sqrt{[L(R-L)]}/\pi\}} \qquad (1)$$

where L denotes length of the resonator, provided neglecting, for symplification, crystal effects (thermal lens effects, optical path change, etc.), and R is curvature of the concave mirror.

SUMMARY OF THE INVENTION

It is an object of the present invention to provide a solid-state laser device, by which it is possible to obtain high output, to easily perform the matching of optical axes with two wavelengths, and to provide high efficiency and to carry out frequency conversion.

To attain the above object, the solid-state laser device according to the present invention comprises a first resonator arranged on a first optical axis, a second resonator arranged on a second optical axis, a first light emitter for entering an excitation light to the first resonator, a second light emitter for entering an excitation light to the second resonator, a common optical axis portion commonly used by the first optical axis and the second optical axis, a wavelength separating plate for separating the first optical axis from the second optical axis so that the common optical axis portion can be commonly used by the optical axes, an output portion provided on the common optical axis portion, a first solid-state laser medium arranged on a separated optical axis of the first optical axis, a second solid-state laser medium arranged on a separated optical axis of the second optical axis, and an optical crystal for wavelength conversion arranged on the common optical axis portion. Also, the present invention provides the solid-state laser device as described above, wherein the first resonator and the second resonator have concave mirrors and a plane mirror, the concave mirrors are provided on the separated optical axes respectively, and the plane mirror is arranged on the common optical axis. Further, the present invention provides the solid-state laser device as described above, wherein the first light emitter for entering an excitation light to the first resonator and the second light emitter for entering an excitation light to the second resonator can be driven independently. Also, the present invention provides the solid-state laser device as described above, wherein a reflection surface is formed on each of excitation light incident surfaces of the first solid-state laser medium and the second solid-state laser medium, a reflection surface is formed on an output surface of the optical crystal for wavelength conversion, the first resonator is made up between the reflection surface of the first solid-state laser medium and the reflection surface of the optical crystal for wavelength conversion, and the second resonator is made up between the reflection surface of the second solid-state laser medium and the reflection surface of the optical crystal for wavelength conversion. Further, the present invention provides the solid-state laser device as described above, wherein the first solid-state laser medium and the second solid-state laser medium are arranged on a converging portion of the excitation light on the separated optical axes of the first resonator and the second resonator respectively. Also, the present invention provides the solid-state laser device as described above, wherein the optical crystal for wavelength conversion is provide on a beam waist portion of the common optical axis portion. Further, the present invention provides the solid-state laser device as described above, wherein at least one of the first resonator or the second resonator comprises a Q-sw. Also, the present invention provides the solid-state laser device as described above, wherein there are provided a plurality of optical crystals for conversion of different wavelengths, and the optical crystals for wavelength conversion can be inserted to and removed from the common optical axis separately. Further, the present invention provides the solid-state laser device as described above, wherein the first light emitter and the second light emitter have a plurality of LD light emitting elements, and laser beams from each of the LD light emitting elements are bundled together by an optical fiber and are projected to the first resonator and the second resonator. Also, the present invention provides the solid-state laser device as described above, comprising a plurality of laser beam emitting units and an optical means for combining the laser beams emitted from the plurality of laser beam emitting units so that the laser beams have coaxial optical axes, wherein each of the laser beam emitting units comprises the first resonator arranged on the first optical axis and the second resonator arranged on the second optical axis, the first optical axis and the second optical axis have a common output portion and are separated by the wavelength separating plate, the first solid-state laser medium is provided on the separated optical axis of the first optical axis, the second solid-state laser medium is provided on the separated optical axis of the second optical axis, and the optical crystal for wavelength conversion is provided on the common optical axis portion.

DETAILED DESCRIPTION OF THE PREFERRED EMBODIMENT

Figure 1:
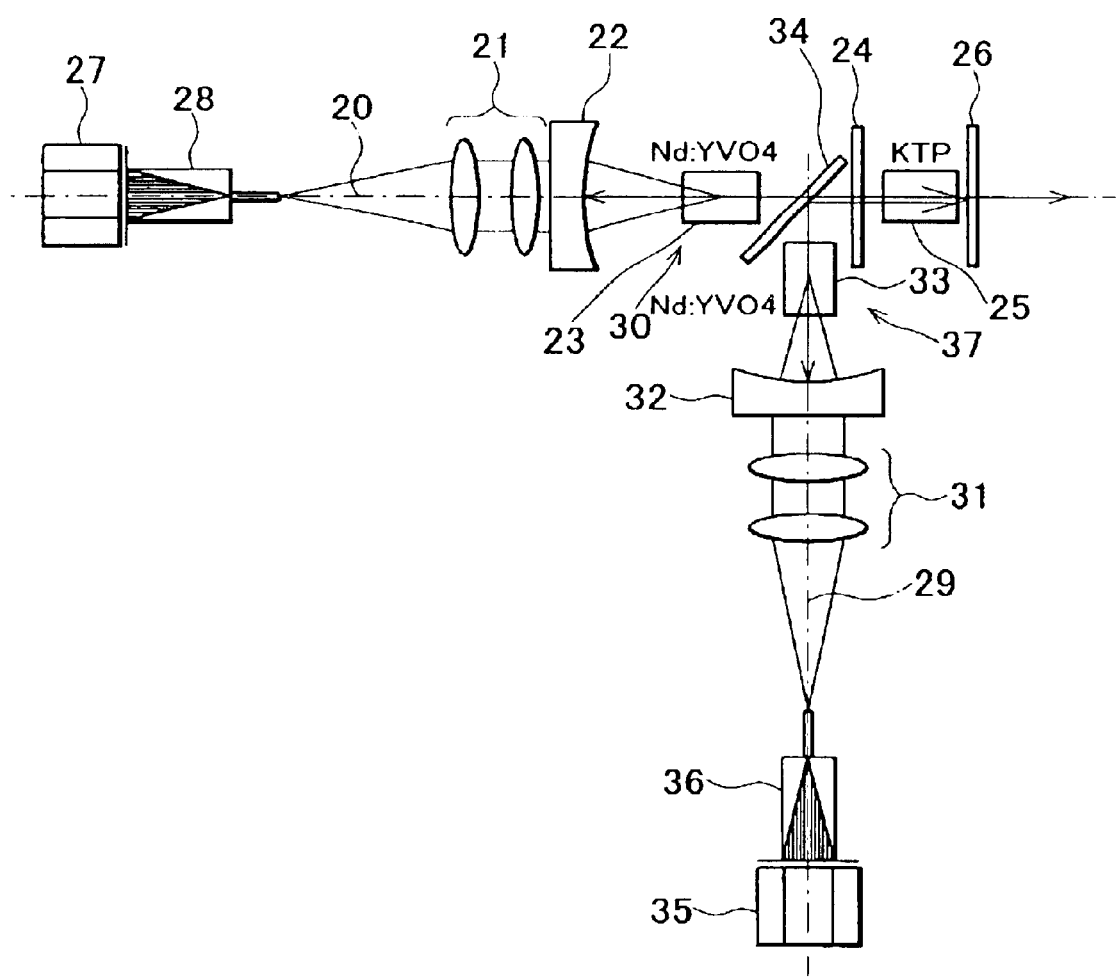
FIG. 1 is a schematical block diagram showing a first embodiment of the present invention.

Description will be given below on embodiments of the present invention referring to the drawings.

FIG. 1 shows a first embodiment of the present invention. A first condenser lens unit 21, a first concave mirror 22, a first solid-state laser medium (a first laser crystal) 23, an intermediate mirror 24, a nonlinear optical medium (optical crystal for wavelength conversion) 25, and an output mirror 26 are arranged on a first optical axis 20. An LD light emitter 27 is disposed at a position opposite to the first condenser lens unit 21, and the LD light emitter 27 has a predetermined number of LDs arranged in one row. Laser beams emitted from individual LDs are bundled together by bundling optical fibers 28, and the beams are sent to the first condenser lens unit 21 as a combined laser beam.

Between the first solid-state laser medium 23 and the intermediate mirror 24 and along a second optical axis 29, which crosses the first optical axis 20 at an angle of 90°, for instance, there are arranged a second condenser lens unit 31, a second concave mirror 32, and a second solid-state laser medium (a second laser crystal) 33. A wavelength separating plate 34 is arranged at a position where the first optical axis 20 crosses the second optical axis 29. The second optical axis 29 is deflected by the wavelength separating plate 34, and the second optical axis 29 uses a portion between the wavelength separating plate 34 and the output mirror 26 in common with the first optical axis 20. The optical crystal 25 for wavelength conversion is arranged on the portion, which is commonly used by the first optical axis 20 and the second optical axis 29.

An LD light emitter 35 is arranged at a position opposite to the second condenser lens unit 31, and the LD light emitter 35 has a predetermined number of LDs arranged in one row. Laser beams emitted from individual LDs are bundled together by bundling optical fibers 36, and the laser beams are sent into the second condenser lens unit 31 as a combined laser beam.

The first concave mirror 22 is highly transmissive to a wavelength λ, which is an excitation light, and it is highly reflective to a wavelength λ1 of a first fundamental wave. The intermediate mirror 24 is highly transmissive to the wavelength λ1 or a wavelength λ2, and it is highly reflective to a wavelength λ3 of a wavelength conversion light [SHG1 (λ1/2), SHG2 (λ2/2), sum frequency mixing (SFM) or differential frequency mixing (SFM); Hereinafter, description will be given on sum frequency mixing (SFM).]. Further, the output mirror 26 is highly reflective to the wavelengths λ1 and λ2, and it is highly transmissive to the wavelength λ3 of the wavelength conversion light [SHG1 (λ1/2), SHG2 (λ2/2), sum frequency mixing (SFM) or (differential frequency mixing (DFM); Hereinafter, description will be given on sum frequency mixing (SFM).].

The second concave mirror 32 is highly transmissive to excitation light with wave λ, and it is highly reflective to a second fundamental wave λ2. The wavelength separating plate 34 is highly transmissive to the first fundamental wave λ1, and it is highly reflective to the second fundamental wave λ2. The components between the first concave mirror 22 and the output mirror 26 make up together a first resonator 30 for the first fundamental wave. The components between the second concave mirror 32 and the output mirror 26 make up together a second resonator 37 for the second fundamental wave.

In the arrangement as described above, the LD light emitter 27 and the LD light emitter 35 emit wavelength A 809 nm as excitation light, and Nd:YVO$_4$ having oscillation lines of 1342 nm and 1064 nm is used as the first solid-state laser medium 23 and the second solid-state laser medium 33 respectively. In this case, KTP (KTiOPO$_4$; titanyl potassium phosphate) is used as the optical crystal 25 for wavelength conversion. A distance L1 between a reflection surface of the first concave mirror 22 and a reflection surface of the output mirror 26 and a distance L2 between a reflection surface of the second concave mirror 32 and the reflection surface of the output mirror 26 are set in such manner that a beam waist ω1 of the first resonator 30 and a beam waist ω2 of the second resonator 37 are approximately equal to each other.

From the equation (1):

$$\omega 1^2 = \lambda 1 \sqrt{\sqrt{L1(R1-L1)}/\pi}$$

$$\omega 2^2 = \lambda 2 \sqrt{\sqrt{L2(R2-L2)}/\pi}$$

If it is assumed that ω1 and ω2 are approximately equal to each other:

$$\lambda 1^2 L1(R1-L1) = \lambda 2^2 L2(R2-L2)$$

The laser beams emitted from the LD light emitter 27 pass through the optical fibers 28 and are converged to the first solid-state laser medium 23 by the first condenser lens unit 21, and a laser beam with the first fundamental wave λ1=1342 nm is oscillated between the first concave mirror 22 and the output mirror 26. Also, the laser beams emitted from the LD light emitter 35 pass through the optical fibers 36 and are converged into the second solid-state laser medium 33 by the second condenser lens unit 31. After being reflected by the wavelength separating plate 34, a laser beam with the second fundamental wave λ2=1064 nm is oscillated between the second concave mirror 32 and the output mirror 26.

Further, the laser beams with the first fundamental wave λ1 and the second fundamental wave λ2 pass through the optical crystal 25 for wavelength conversion, and sum frequency of 593 nm is generated. A laser beam with a wavelength of 593 nm directed toward the intermediate mirror 24 is reflected by the intermediate mirror 24, and it is emitted as a laser beam with the wavelength of 593 nm by the output mirror 26.

In the arrangement of the solid-state laser device as described above, the first resonator 30 and the second resonator 37 are arranged separately from the intermediate mirror 24, the optical crystal 25 for wavelength conversion and the output mirror 26. As a result, the excitation light entering the first resonator 30 from the LD light emitter 27 forms a converging point between the first concave mirror 22 and the wavelength separating plate 34 in the figure, and the converging point is within or closer to the first solid-state laser medium 23. Similarly, the laser beam entering the second resonator 37 from the LD light emitter 35 forms a converging point between the second concave mirror 32 and the wavelength separating plate 34 in the figure, and the converging point is within or closer to the second solid-state laser medium 33.

Excitation efficiency of the first solid-state laser medium 23 and the second solid-state laser medium 33 is influenced by an energy density or a direction of polarization of the laser beam. Because the positions of the first solid-state laser medium 23 and the second solid-state laser medium 33 can be separately adjusted, these can be set at optimal positions. The direction of polarization can be adjusted separately for each of the LD light emitter 27 and the LD light emitter 35, and adjustment can be made in easy manner. In the positional adjustment of the optical members, e.g. in the matching of optical axes of the first concave mirror 22 and the second concave mirror 32, the adjustment of one of the first concave mirror 22 or the second concave mirror 32 does not exert influence on the adjustment of another concave mirror. Thus, after the adjustment has been completed on one of the first concave mirror 22 and the second concave mirror 32, the adjustment of the other concave mirror can be carried out, and this makes the adjustment much easier. Further, the directions of polarization of two fundamental lights can be made parallel to each other or can be crossed perpendicularly to each other. As a result, there is no restriction on the optical crystal 25 for wavelength conversion, and any type of optical crystal for wavelength conversion can be used.

Also, it is possible to design in such manner that common portions of the first optical axis 20 and the second optical axis 29 perfectly concur with each other. By making them perfectly concur with each other, conversion efficiency of the optical crystal 25 for wavelength conversion is improved.

Also, it may be designed in such manner that the first resonator and the second resonator are oscillated with the same wavelength ($\lambda 1 = \lambda 2$). In this case, a polarization separating plate (P/S) is used as the wavelength separating plate 34. Oscillation wavelength will be 1064 rim (green at 532 nm) in case of Nd:YAG, for instance.

When a plurality of optical crystals 25 for wavelength conversion are prepared and angle adjustment is made on each of the plurality of optical crystals 25 for DFM, SHG1 ($\lambda 1/2$), and SHG2 ($\lambda 2/2$) respectively, and when these are separately inserted into the common optical axis portion of the first optical axis 20 and the second optical axis 29, 5136 nm is obtained as DFM, 671 nm is obtained as SHG1 ($\lambda 1/2$), and 532 nm as SHG2 ($\lambda 2/2$).

Specifically, when the optical crystal 25 for wavelength conversion used for DFM is inserted under the condition that the laser beams are projected from the LD light emitter 27 and the LD light emitter 35, a laser beam of differential frequency is outputted. When the optical crystal 25 for wavelength conversion used for 1342 nm is inserted under the condition that the laser beam from the LD light emitter 27 only is projected, a laser beam with 671 nm is outputted. When the optical crystal 25 for wavelength conversion used for 1064 nm is inserted under the condition that the laser beam from the LD light emitter 35 only is projected, a laser beam with wavelength of 532 nm is outputted.

Under the arrangement as described above, only the laser beam from the LD light emitter 27 is projected to the first solid-state laser medium 23, and only the laser beam from the LD light emitter 35 is projected to the second solid-state laser medium 33. Accordingly, the load applied on the first solid-state laser medium 23 and the second solid-state laser medium 33 are low, and a wavelength conversion light is obtained from the laser beams from two sets of light emitters, i.e. the LD light emitter 27 and the LD light emitter 35. Thus, high output can be achieved.

As the optical crystal 25 for wavelength conversion, BBO ($\beta$-$BaB_2O_4$; $\beta$-lithium borate), LBO ($LiB_3O_5$; lithium triborate), $KNbO_3$(potassium niobate), etc. may be adopted in addition to KTP.

Figure 2:
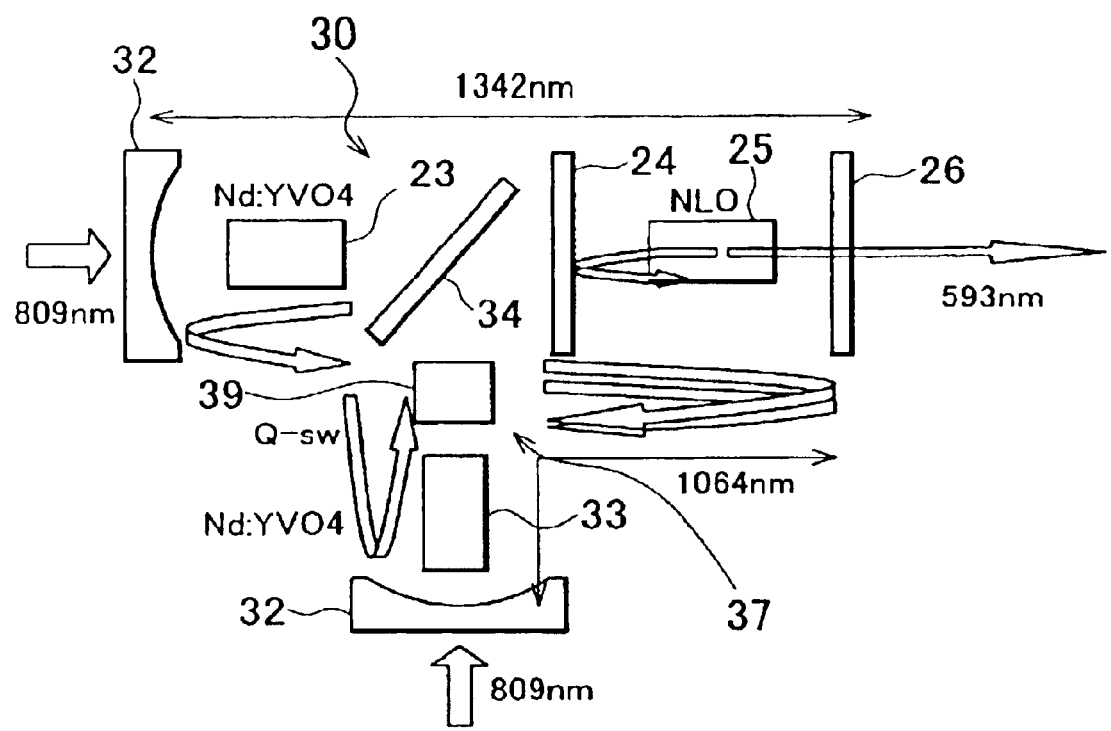
FIG. 2 is a schematical block diagram of an essential portion of a second embodiment of the present invention.

FIG. 2 shows a second embodiment of the present invention. In FIG. 2, the same component as shown in FIG. 1 is referred by the same symbol.

A Q-sw 39 is arranged between the second solid-state laser medium 33 and the wavelength separating plate 34 of the second resonator 37. The Q-sw 39 comprises a saturable absorber (crystal). The Q-sw 39 absorbs the incident laser beam under saturable condition. When an amount of absorption exceeds a predetermined level, the laser beam is emitted. Thus, the Q-sw 39 carries out switching action. As a result, the laser beam emitted from the solid-state laser device is emitted in pulsed state by the switching action of the Q-sw 39.

As the material of the Q-sw 39, Cr:YAG, semiconductor, etc., may be used, and AO (acoustooptic), EO (electrooptic) Q-sws also may be used.

Normally, on a crystal end surface of a laser crystal, concave mirror action occurs due to thermal lens effect caused by excitation. Therefore, it may be designed in such manner that the first concave mirror 22 and the second concave mirror 32 are omitted, and that reflection surfaces for resonator may be formed on an end surface on the LD light emitter 27 side of the first solid-state laser medium 23 and on an end surface on the LD light emitter 35 side of the second solid-state laser medium 33.

Figure 3:
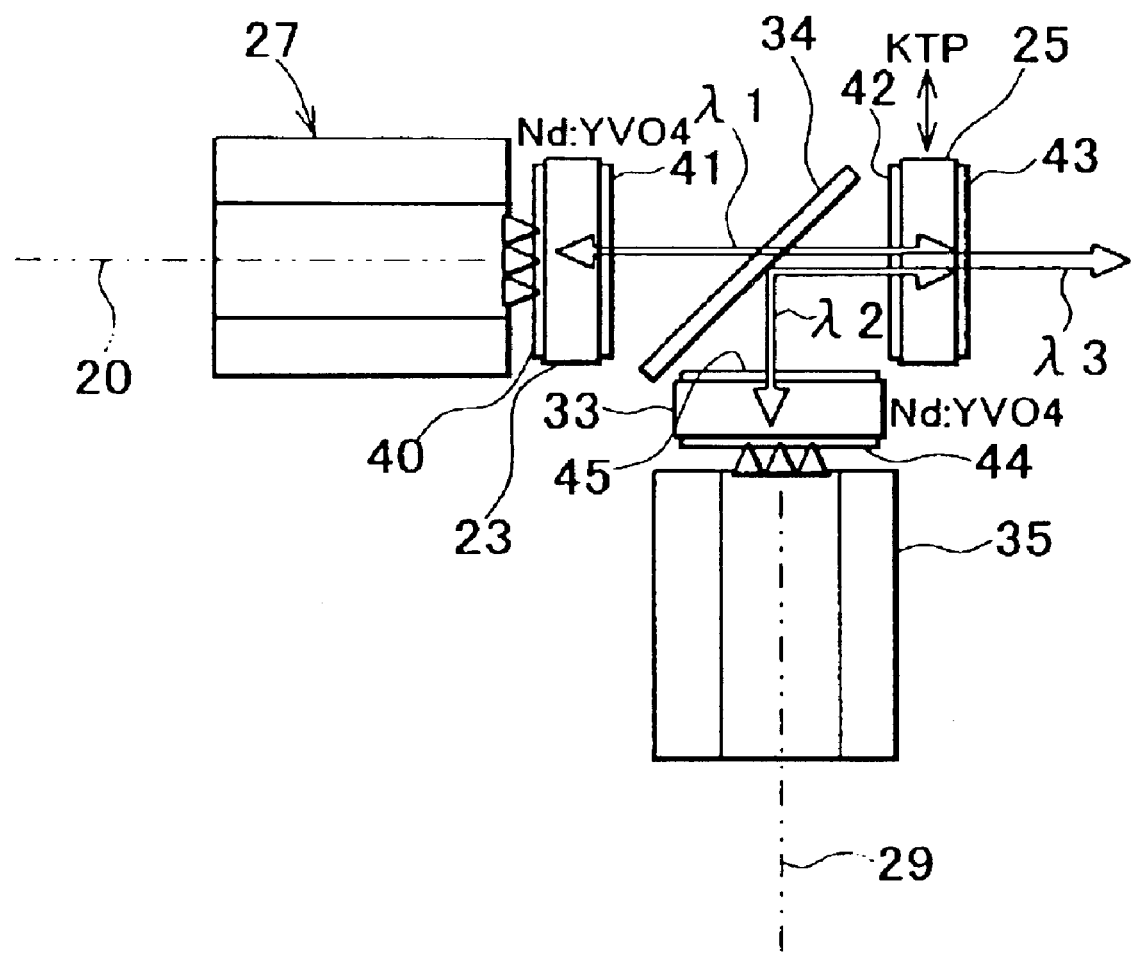
FIG. 3 is a schematical block diagram of an essential portion of a third embodiment of the present invention.

In a third embodiment of the present invention shown in FIG. 3, the first concave mirror 22, the second concave mirror 32, the intermediate mirror 24, and the output mirror 26 in the above embodiment are omitted.

The first solid-state laser medium 23 is arranged opposite to the LD light emitter 27 on the first optical axis 20, and the optical crystal 25 for wavelength conversion is placed putting the wavelength separating plate 34 therebetween. The LD light emitter 27 and the first solid-state laser medium 23 are arranged on the first optical axis 20, and the optical crystal 25 for wavelength conversion is arranged on a portion commonly used by the first optical axis 20 and the second optical axis 29 as described later.

On a surface of the first solid-state laser medium 23 facing to the LD light emitter 27, a dielectric reflection film 40 is formed, which is highly transmissive to the excitation light $\lambda$ and is highly reflective to the first fundamental wave $\lambda 1$. On a surface opposite to the facing surface of the first solid-state laser medium 23, a film 41 is formed, which is highly transmissive to the first fundamental wave $\lambda 1$. The wavelength separating plate 34 is highly transmissive to the first fundamental wave $\lambda 1$ and is highly reflective to the second fundamental wave $\lambda 2$. On a surface on the LD light emitter 27 side of the optical crystal 25 for wavelength conversion, a dielectric reflection film 42 is formed, which is highly transmissive to the first fundamental wave $\lambda 1$ and the second fundamental wave $\lambda 2$ and is highly reflective to the wavelength conversion light $\lambda 3$. On a surface opposite to the surface on the LD light emitter 27 of the optical crystal 25 for wavelength conversion (i.e. output surface), a dielectric reflection film 43 is formed, which is highly reflective to the first fundamental wave $\lambda 1$ and to the second fundamental wave $\lambda 2$ and is highly transmissive to the wavelength conversion light $\lambda 3$.

The wavelength separating plate 34 is arranged on the second optical axis 29, which crosses the first optical axis 20, and there are provided the second solid-state laser medium 33 and the LD light emitter 35 facing toward the wavelength separating plate 34.

On a surface of the second solid-state laser medium 33 facing to the LD light emitter 35, a dielectric reflection film 44 is formed, which is highly transmissive to the excitation light $\lambda$ and is highly reflective to the second fundamental wave $\lambda 2$. On a surface opposite to the facing surface of the second solid-state laser medium 33 on an opposite side the LD light emitter 35, a film 45 is formed, which is highly transmissive to the second fundamental wave λ2.

A first resonator is made up between the dielectric reflection film 40 and the dielectric reflection film 43, and a second resonator is made up between the dielectric reflection film 44 and the dielectric reflection film 43.

The operation of the third embodiment is the same as the operation of the first embodiment explained in connection with FIG. 1, and description is not given here. In the third embodiment, the first concave mirror 22, the second concave mirror 32, the intermediate mirror 24, and the output mirror 26 are omitted, and the solid-state laser device can be designed in more compact size.

When the film is formed directly on the optical crystal 25 for wavelength conversion, the changes of characteristics during replacement of the wavelength conversion crystal 25 and the wavelength separating plate 34 can be minimized.

Figure 4:
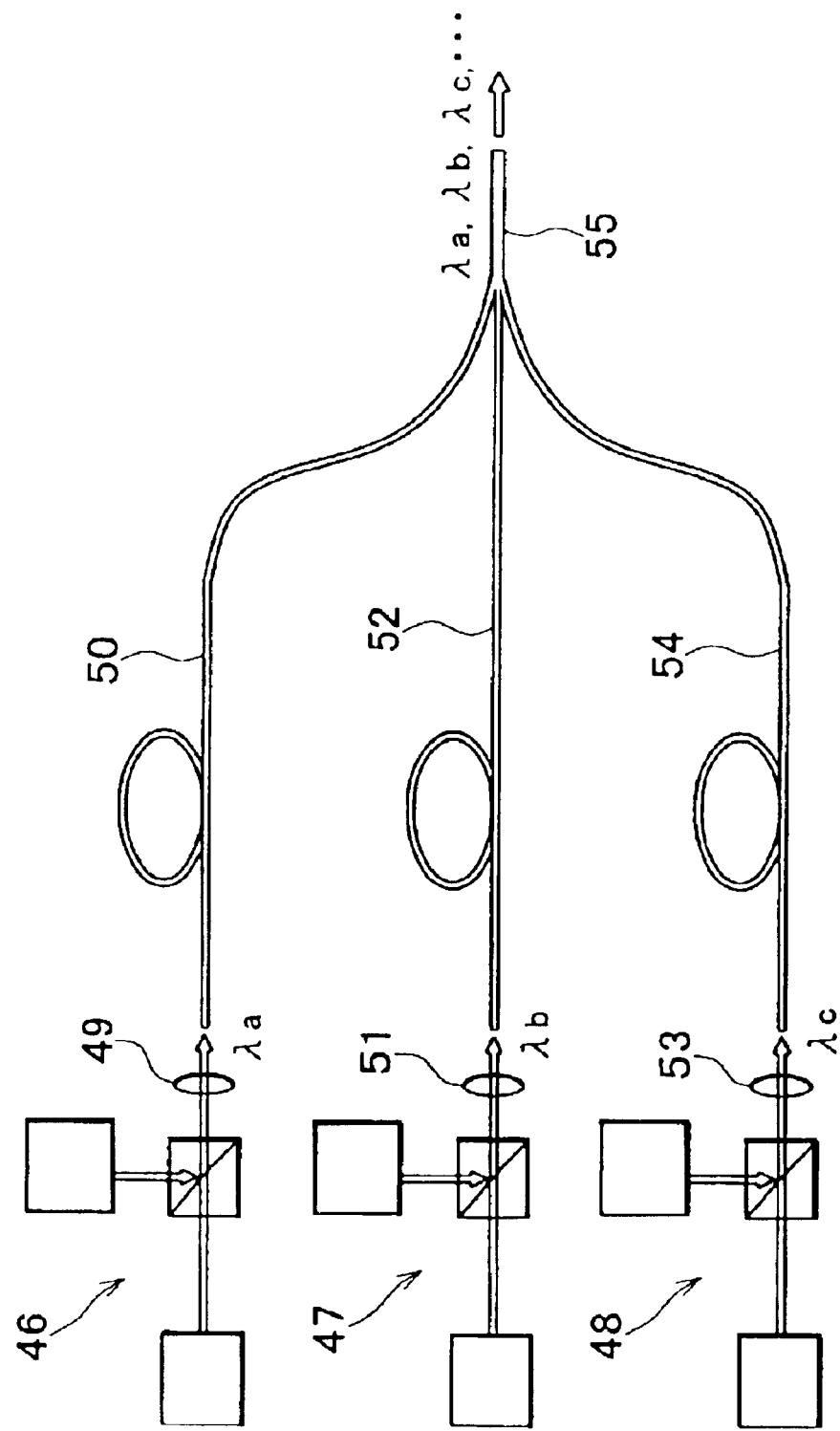
FIG. 4 is a schematical block diagram of an essential portion of a fourth embodiment of the present invention.
Figure 5:
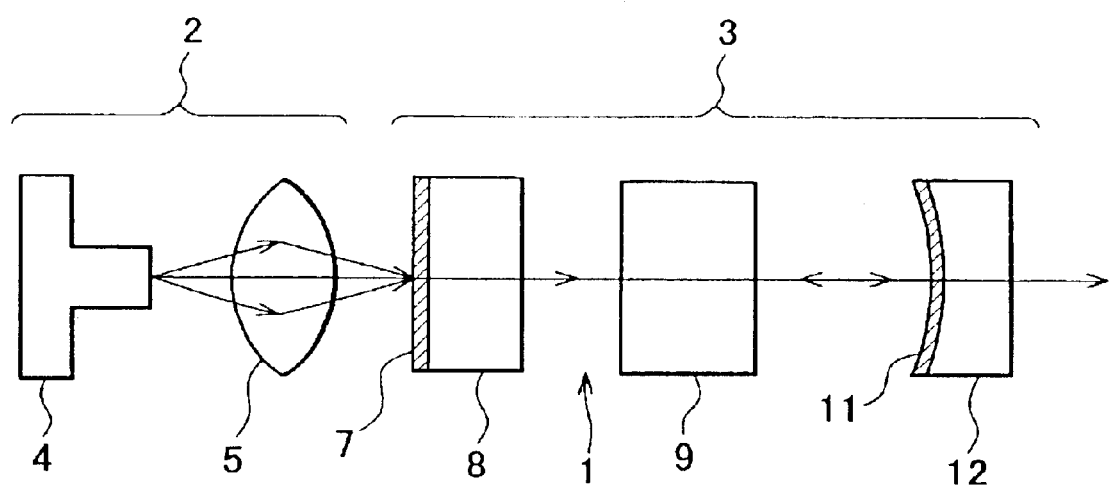
FIG. 5 is a schematical block diagram of a conventional device.
Figure 6:
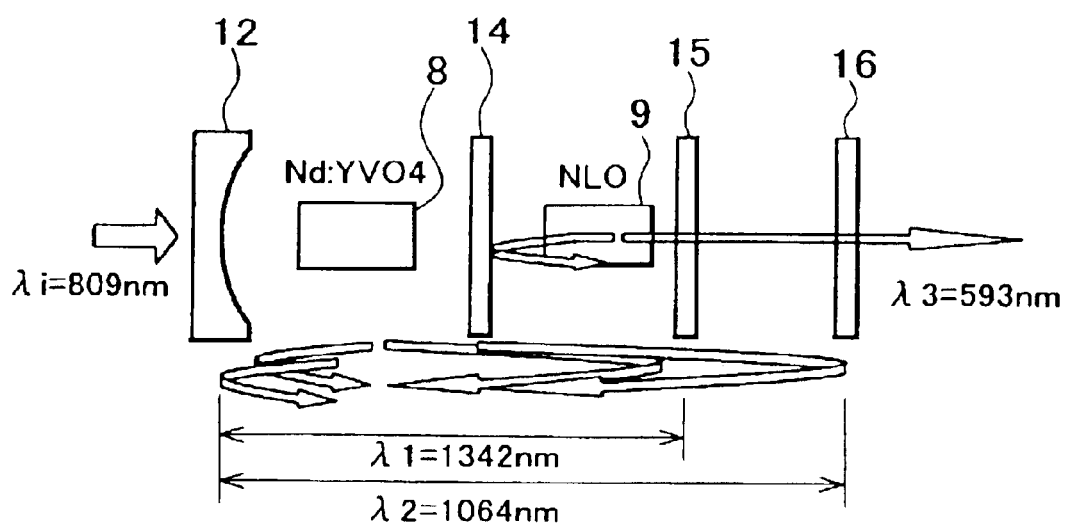
FIG. 6 is a schematical block diagram of another type of conventional device.

FIG. 4 shows a fourth embodiment, which uses the third embodiment.

In the figure, reference numerals 46, 47, and 48 each represents a laser beam emitting unit. The arrangement is equivalent to the arrangement in the solid-state laser device shown in FIG. 3. The emitted laser beams have wavelengths of λa, λb, and λc respectively.

The wavelengths λa, λb, and λc of the laser beams can have the wavelength as required respectively depending on the selection of the excitation light A and depending on adequate selection of the first solid-state laser medium 23 and the optical crystal 25 for wavelength conversion.

A laser beam emitted from a first laser beam emitting unit 46 is converged by a condenser lens 49 and enters an optical fiber 50. A laser beam emitted from a second laser beam emitting unit 47 is converged by a condenser lens 51 and enters an optical fiber 52. A laser beam emitted from a third laser beam emitting unit 48 is converged by a condenser lens 53 and enters an optical fiber 54. Output portions 55 of the optical fibers 50, 52, and 54 are welded together for a predetermined length, and the laser beams with wavelengths of λa, λb, and λc are combined together, and these beams are emitted from the output portion 55 as the laser beams having the same optical axis.

When the first laser beam emitting unit 46, the second laser beam emitting unit 47, and the third laser beam emitting unit 48 are all driven, the laser beam emitted from the output portion 55 has a mixed color of the wavelengths λa, λb, and λc. When any one unit, e.g. when only the first laser beam emitting unit 46, is driven, the laser beam has a single color of the wavelength λa.

In the fourth embodiment, a plurality of wavelengths can be emitted efficiently and coaxially, and this can be used as a light source for a projector, for instance.

In the fourth embodiment, the optical fiber is used as the means to combine the laser beams to the same optical axis, while a mirror may be used, which can separately reflect or separately transmit wavelengths.

The solid-state laser device according to the present invention comprises a first resonator arranged on a first optical axis, a second resonator arranged on a second optical axis, a first light emitter for entering an excitation light to the first resonator, a second light emitter for entering an excitation light to the second resonator, a common optical axis portion commonly used by the first optical axis and the second optical axis, a wavelength separating plate for separating the first optical axis from the second optical axis so that the common optical axis portion can be commonly used by the optical axes, an output portion provided on the common optical axis portion, a first solid-state laser medium arranged on a separated optical axis of the first optical axis, a second solid-state laser medium arranged on a separated optical axis of the second optical axis, and an optical crystal for wavelength conversion arranged on the common optical axis portion. As a result, the excitation light can be entered separately to each of the first resonator and the second resonator, and high output can be achieved. Because optical axes of the first resonator and the second resonator are separated from each other, the matching of optical axes with two different wavelengths can be easily performed.

Also, in the solid-state laser device of the present invention, a reflection surface is formed on each of excitation light incident surfaces of the first solid-state laser medium and the second solid-state laser medium, a reflection surface is formed on an output surface of the optical crystal for wavelength conversion, the first resonator is made up between the reflection surface of the first solid-state laser medium and the reflection surface of the optical crystal for wavelength conversion, and the second resonator is made up between the reflection surface of the second solid-state laser medium and the reflection surface of the optical crystal for wavelength conversion. As a result, there is no need to provide a reflection mirror separately, and it is possible to design the device with simple structure and in compact size.

Further, the first solid-state laser medium and the second solid-state laser medium are arranged on a converging portion of the excitation light on the separated optical axes of the first resonator and the second resonator. As a result, it is possible to achieve excitation with high efficiency, and the matching of optical axes can be performed easily. A beam waist of fundamental wave of each of the first resonator and the second resonator can be formed on a portion commonly used by the resonators. By arranging the optical crystal for wavelength conversion, it is possible to perform frequency conversion with high efficiency.

What is claimed is:

1. A solid-state laser device, comprising a first optical axis, a second optical axis crossing said first optical axis, a first resonator arranged on said first optical axis for oscillating a first fundamental wave λ1 between a distance L1 from a first concave mirror having a reflection surface with curvature R1 to a plane output mirror, a second resonator arranged on said second optical axis for oscillating a second fundamental wave λ2 between a distance L2 from a second concave mirror having a reflection surface with curvature R2 to said plane output mirror, a first light emitter for entering an excitation light to said first resonator, a second light emitter for entering an excitation light to said second resonator, a wavelength separating plate arranged on a portion where said first optical axis crosses said second optical axis and for deflecting said second optical axis so as to form a common optical axis portion which is commonly used by said first optical axis and said second optical axis, and an optical crystal for wavelength conversion arranged on said common optical axis portion, wherein said output plane mirror is arranged on said common optical axis portion and is commonly used by said first resonator and said second resonator, said optical crystal for wavelength conversion is arranged on said common optical axis portion between said plane output mirror and said wavelength separating plate, said wavelength separating plate transmits the first fundamental wave, and reflects the second fundamental wave on said common optical axis portion, said first resonator and said second resonator have a relation of $\lambda 1^2$ L1(R1−L1)=$\lambda 2^2$ L2 (R2−L2), and beam waists of said first resonator and a beam waist of said second resonator are formed on said optical crystal for wavelength conversion.

2. A solid-state laser device according to claim 1, wherein there are provided a first solid-state laser medium arranged on a separated optical axis of said first optical axis and a second solid-state laser medium arranged on a separated optical axis of said second optical axis, a reflection surface is formed on each of excitation light incident surfaces of said first solid-state laser medium and said second solid-state laser medium, a reflection surface is formed on an output surface of said optical crystal for wavelength conversion, said first resonator is made up between said reflection surface of said first solid-state laser medium and said reflection surface of said optical crystal for wavelength conversion, and said second resonator is made up between said reflection surface of said second solid-state laser medium and said reflection surface of said optical crystal for wavelength conversion.

3. A solid-state laser device according to claim 1, wherein at least one of said first resonator or said second resonator comprises a Q-sw, and a laser beam is output in a pulsed state.

4. A solid-state laser device according to claim 1, wherein said first light emitter and said second light emitter have a plurality of LD light emitting elements, and laser beams from each of said LD light emitting elements are bundled together by an optical fiber and are projected to said first resonator and said second resonator.

5. A solid-state laser device according to claim 1, comprising a plurality of laser beam emitting units and an optical means for combining the laser beams emitted from said plurality of laser beam emitting units so that the laser beams have coaxial optical axes, wherein each of said laser beam emitting units comprises said first resonator arranged on said first optical axis and said second resonator arranged on said second optical axis, said first optical axis and said second optical axis have a common output portion and are separated by said wavelength separating plate, a first solid-state laser medium is provided on the separated optical axis of said first optical axis, a second solid-state laser medium is provided on the separated optical axis of said second optical axis, and said optical crystal for wavelength conversion is provided on the common optical axis portion.

* * * * *

UNITED STATES PATENT AND TRADEMARK OFFICE
CERTIFICATE OF CORRECTION

PATENT NO. : 6,813,306 B2
DATED : November 2, 2004
INVENTOR(S) : Masayuki Momiuchi et al.

It is certified that error appears in the above-identified patent and that said Letters Patent is hereby corrected as shown below:

<u>Column 6,</u>
Line 20, Equation 1, replace with the following:

-- $\omega 1^2 = \lambda 1 \sqrt{L1 \ (R1 - L1)} \ / \pi$
$\omega 2^2 = \lambda 2 \sqrt{L2 \ (R2 - L2)} \ / \pi$ --

Signed and Sealed this

Tenth Day of May, 2005

JON W. DUDAS
*Director of the United States Patent and Trademark Office*